(12) United States Patent
Lin et al.

(10) Patent No.: US 11,864,199 B2
(45) Date of Patent: Jan. 2, 2024

(54) METHODS FOR DATA TRANSMISSION AND USER EQUIPMENT

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

(\*) Notice: Subject to any disclaimer, the term of this patent is extended or adjusted under 35 U.S.C. 154(b) by 85 days.

(21) Appl. No.: 17/710,376

(22) Filed: Mar. 31, 2022

(65) Prior Publication Data

US 2022/0225396 A1 Jul. 14, 2022

Related U.S. Application Data

(63) Continuation of application No. 17/475,331, filed on Sep. 14, 2021, now Pat. No. 11,324,032, which is a
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1819* (2013.01); *H04L 1/1896* (2013.01); *H04W 72/1273* (2013.01)

(58) Field of Classification Search
CPC .......... H04W 72/23; H04W 72/1273; H04L 1/1896; H04L 1/1819
(Continued)

(56) References Cited

U.S. PATENT DOCUMENTS 11,324,032 B2 \* 5/2022 Lin ...................... H04L 1/1819
2015/0043394 A1 2/2015 Lin et al.

FOREIGN PATENT DOCUMENTS

CN 109392152 2/2019

OTHER PUBLICATIONS

EPO, Communication for EP Application No. 19922652.3, dated Aug. 29, 2022.
(Continued)

*Primary Examiner* — Peter G Solinsky
(74) *Attorney, Agent, or Firm* — Hodgson Russ LLP (57) ABSTRACT

A method for data transmission, a user equipment (UE), and a network device are provided. The method includes the following. A first downlink control information (DCI) is received, where the first DCI is used for scheduling a first physical downlink shared channel (PDSCH), and the first PDSCH carries a first hybrid automatic repeat request (HARQ) process. A second PDSCH after the first PDSCH. If a value of a PDSCH feedback time information field in the first DCI is a specific value, a HARQ process carried by the second PDSCH is one of HARQ processes supported by a UE, and the HARQ processes supported by the UE comprises the first HARQ process. If the value of the PDSCH feedback time information field in the first DCI is not the specific value, the HARQ process carried by the second PDSCH is not the first HARQ process.

15 Claims, 4 Drawing Sheets

Related U.S. Application Data continuation of application No. PCT/CN2019/081032, filed on Apr. 2, 2019.

(51) Int. Cl.
*H04L 1/1867* (2023.01)
*H04W 72/1273* (2023.01)

(58) Field of Classification Search
USPC .......................................................... 370/329
See application file for complete search history.

(56) References Cited

OTHER PUBLICATIONS

CNIPA, First Office Action for CN Application No. 202110915193.3, dated Sep. 27, 2022.
IPI, Office Action for IN Application No. 202127042280, dated Mar. 23, 2022.
Qualcomm Incorporated, "Remaining Issues on DL/UL Scheduling, Processing Time and HARQ management," 3GPP TSG-RAN WG1 Meeting #92, 1802842, Feb. 2018.
JPO, Office Action for JP Application No. 2021-557693, dated Jan. 17, 2023.

\* cited by examiner

METHODS FOR DATA TRANSMISSION AND USER EQUIPMENT

CROSS REFERENCE TO RELATED APPLICATION(S)

This application is a continuation of U.S. patent application Ser. No. 17/475,331, filed Sep. 14, 2021, which is a continuation of International Application No. PCT/CN2019/081032, filed Apr. 2, 2019, the entire disclosures of which are incorporated herein by reference.

TECHNICAL FIELD

This disclosure relates to the field of communication technology, and more particularly to methods for data transmission and related devices.

RELATED ARTS

In the $5^{th}$ generation (5-generation, 5G) mobile communication new radio (NR), an ultra-reliable low latency (URLLC) service is introduced, which is characterized by ultra-reliable transmission in an extremely short latency (for example, 1 ms (millisecond)). It is specified in the $3^{rd}$ generation partnership project (3GPP) release 15 (Rel-15) that, before transmission of acknowledgement/negative acknowledgement (ACK/NACK) of a downlink (DL) hybrid automatic repeat request (HARQ) process, a HARQ process index cannot be reused. When a HARQ process of URLLC adopts no-feedback DL transmission, according to an existing rule, the process cannot be reused, which decreases the maximum number of HARQ processes that are actually supported, thus affecting data transmission rate. In addition, in the case where multiple uplink (UL) channels overlap in time domain, if a priority of each channel is determined through indication signaling transmitted by a base station, indication signaling overhead will be increased.

SUMMARY

In a first aspect, a method for data transmission is provided. The method includes the following. A method for data transmission, a user equipment (UE), and a network device are provided. The method includes the following. A first downlink control information (DCI) is received, where the first DCI is used for scheduling a first physical downlink shared channel (PDSCH), and the first PDSCH carries a first hybrid automatic repeat request (HARQ) process. A second PDSCH after the first PDSCH. If a value of a PDSCH feedback time information field in the first DCI is a specific value, a HARQ process carried by the second PDSCH is one of HARQ processes supported by a UE, and the HARQ processes supported by the UE comprises the first HARQ process. If the value of the PDSCH feedback time information field in the first DCI is not the specific value, the HARQ process carried by the second PDSCH is not the first HARQ process.

In a second aspect, a UE is provided. The UE includes a processor, a memory, and a transceiver. The processor is configured to execute programs stored in the memory, to make the transceiver to: receive a first downlink control information, where the first DCI is used for scheduling a first PDSCH, and the first PDSCH carries a first HARQ process, receive a second PDSCH after the first PDSCH. If a value of a PDSCH feedback time information field in the first DCI is a specific value, a HARQ process carried by the second PDSCH is one of HARQ processes supported by a UE, and the HARQ processes supported by the UE comprises the first HARQ process. If the value of the PDSCH feedback time information field in the first DCI is not the specific value, the HARQ process carried by the second PDSCH is not the first HARQ process.

In a third aspect, a network device is provided. The network device includes a processor, a memory, and a transceiver. The processor is configured to execute programs stored in the memory, to make the transceiver to: transmit a first downlink control information, where the first DCI is used for scheduling a first PDSCH, and the first PDSCH carries a first HARQ process, transmit a second PDSCH after the first PDSCH. If a value of a PDSCH feedback time information field in the first DCI is a specific value, a HARQ process carried by the second PDSCH is one of HARQ processes supported by a UE, and the HARQ processes supported by the UE comprises the first HARQ process. If the value of the PDSCH feedback time information field in the first DCI is not the specific value, the HARQ process carried by the second PDSCH is not the first HARQ process.

BRIEF DESCRIPTION OF THE DRAWINGS

In order to describe technical solutions of implementations more clearly, the following will give a brief introduction to the accompanying drawings used for describing implementations. Apparently, the accompanying drawings hereinafter described are some implementations of the disclosure. Based on these drawings, those of ordinary skill in the art can also obtain other drawings without creative effort.

DETAILED DESCRIPTION

Technical solutions of implementations will be described clearly and comprehensively below with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

Figure 1:
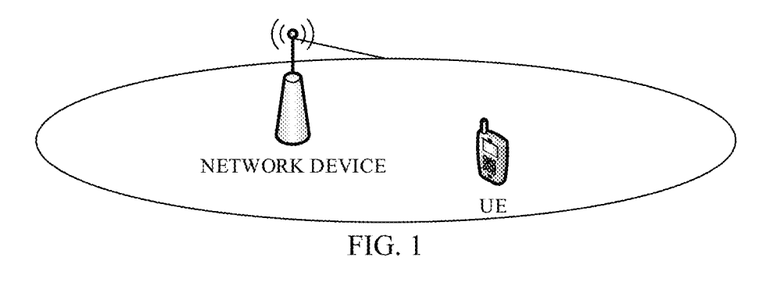
FIG. 1 is a schematic architectural diagram of a data transmission system according to implementations.
Figure 2:
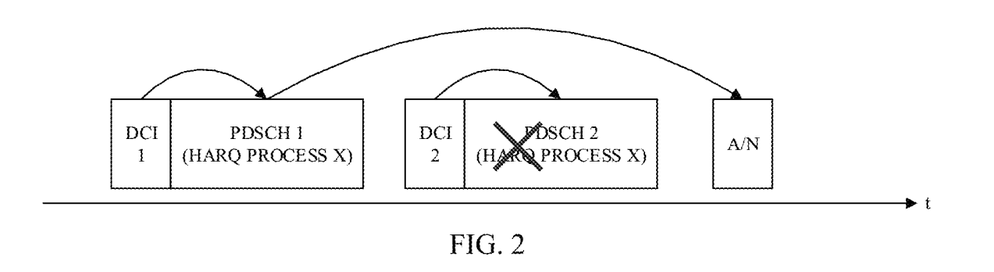
FIG. 2 is a schematic diagram illustrating data transmission according to implementations.

FIG. 1 is a schematic architectural diagram of a data transmission system according to implementations. The data transmission system includes a user equipment (UE) and a network device. The UE may be a terminal, a subscriber unit, a subscriber station, a mobile station, a remote station, an access point, a remote terminal, an access terminal, a user terminal, a user agent, a user device, or a computer device. The network device refers to a device that can communicate with the terminal. The network device may be, for example, a base station, an access point, a node, an evolutional Node B (eNB), or a next generation (5G) base station (gNB). It is specified in new radio (NR) release 15 (Rel-15) that, after receiving downlink control information (DCI) format 1_0 or DCI format 1_1, the UE receives a physical downlink shared channel (PDSCH) scheduled by this DCI (that is, the PDSCH is dynamically scheduled). An identity (ID) of a hybrid automatic repeat request (HARQ) process corresponding to the PDSCH is indicated by the DCI. Before transmitting acknowledgement/negative acknowledgement (ACK/NACK) information corresponding to the PDSCH, the UE does not expect that an process index of a HARQ process corresponding to a new PDSCH scheduled by the base station will be the same as that of the HARQ process corresponding to the previous PDSCH. In other words, after transmission of a downlink (DL) HARQ process and before transmission of ACK/NACK information, the base station cannot reuse the HARQ process index for data transmission. FIG. 2 is a schematic diagram illustrating data transmission according to implementations. As illustrated in FIG. 2, DCI 1 schedules PDSCH 1, where PDSCH 1 adopts HARQ process index X. Before the UE transmits to the base station ACK/NACK information corresponding to PDSCH 1, if the base station has further scheduled PDSCH 2, a HARQ process corresponding to PDSCH 2 is not allowed to use HARQ process index X.

While DCI is scheduling a PDSCH, transmission of ACK/NACK information corresponding to the PDSCH may be indicated through a PDSCH-to-HARQ_feedback timing indicator information field in the DCI. The UE first determines a preconfigured HARQ_feedback timing set. According to different scenarios, the HARQ feedback timing set can be specified in a protocol, or configured through higher-layer signaling. The HARQ feedback timing set can include up to 8 index values. After receiving the DCI, the UE obtains an index value from the PDSCH-to-HARQ_feedback timing indicator information field, and determines an element k in the pre-configured HARQ feedback timing set according to the index value. If the PDSCH scheduled by the DCI is transmitted in slot n, the ACK/NACK information corresponding to the PDSCH is transmitted in slot n+k.

Figure 3:
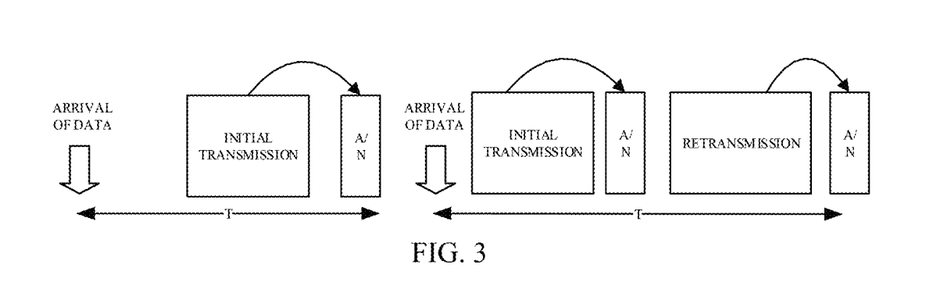
FIG. 3 is a schematic diagram illustrating data transmission according to other implementations.

For an ultra-reliable low latency (URLLC) service, in order to take both low latency and high reliability into consideration, when scheduling the URLLC service, the base station can allocate more physical resources or adopt a more reliable transmission scheme, thereby ensuring that a single transmission is enough to meet requirements. In this case, it is meaningless for the UE to feed back ACK/NACK information. In addition, when an actual transmission time point of a HARQ process is very close to a maximum latency, and thus retransmission will inevitably not meet latency requirements, it is also meaningless for the UE to feed back ACK/NACK information to the base station. FIG. 3 is a schematic diagram illustrating data transmission according to other implementations. As illustrated in FIG. 3, T represents the maximum latency. For DL transmission of the URLLC service, no-feedback transmission needs to be supported. As an example, a specific value of k (for example, meaningless, infinity, etc.) can be indicated through a PDSCH-to-HARQ_feedback timing indicator information field in DCI that schedules a PDSCH, to indicate that the PDSCH scheduled by the DCI has no corresponding ACK/NACK information to be fed back. When k indicated through the PDSCH-to-HARQ_feedback timing indicator information field is another value different from the specific value, the UE can feed back ACK/NACK information according to the value of k.

Figure 4:
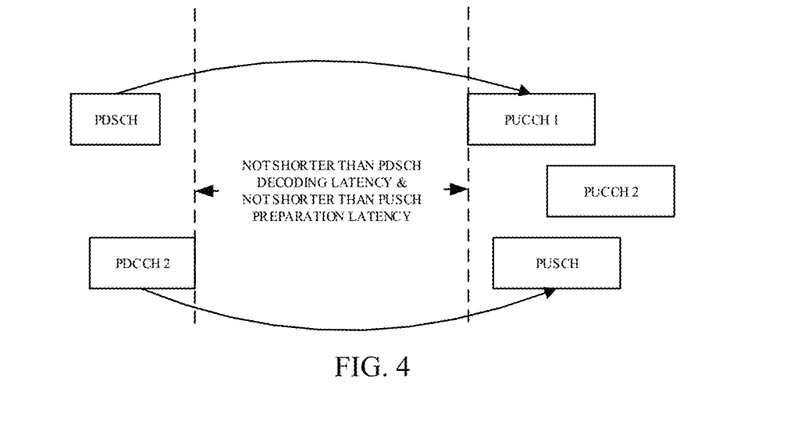
FIG. 4 is a schematic diagram illustrating channel multiplexing according to implementations.

FIG. 4 is a schematic diagram illustrating channel multiplexing according to implementations. In Rel-15, in the case where multiple uplink channels overlap in time domain, if a gap between the earliest start time among start times of the multiple uplink channels and the latest cutoff time among cutoff times of multiple DL channels corresponding to the multiple uplink channels meets requirements on maximum processing latency of the multiple uplink channels, information carried in the multiple uplink channels can be multiplexed in one channel for transmission; otherwise, behavior of the UE is not specified, that is, the base station does not perform such scheduling.

Figure 5:
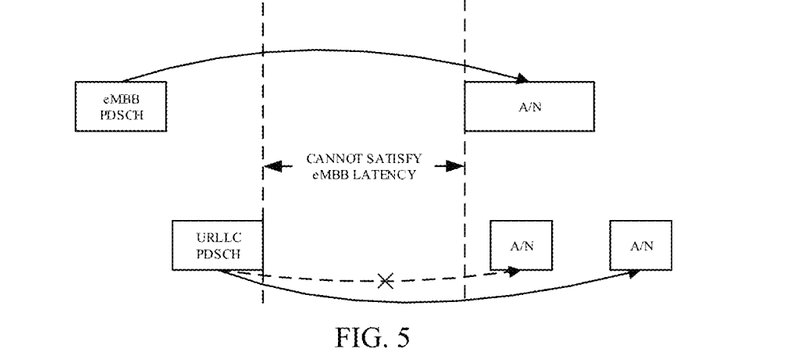
FIG. 5 is a schematic diagram illustrating channel multiplexing according to other implementations.

This apparently cannot meet latency requirements of Rel-16 URLLC. That is, if there exist a channel for an enhance mobile broadband (eMBB) service and a channel for a URLLC service among multiple channels that collide, in an existing method, uplink information of the URLLC service and uplink information of the eMBB service can be multiplexed and transmitted to the base station only when requirements on processing latency of the eMBB service are met. However, requirements on processing latency of the eMBB service are significantly higher than those of the URLLC service. FIG. 5 is a schematic diagram illustrating channel multiplexing according to other implementations. As illustrated in FIG. 5, transmission of a PDSCH of the eMBB service has been completed, and a physical uplink control channel (PUCCH) corresponding to the PDSCH of the eMBB service has been pre-allocated. In this scenario, a PDSCH of the URLLC service arrives later than that of the eMBB service. Since it is impossible to meet requirements on decoding latency of the PDSCH of the eMBB service, ACK/NACK information corresponding to the PDSCH of the URLLC service can only be transmitted at a later time, which increases latency of the URLLC service. In a design of Rel-16 URLLC, the base station is required to be capable of solving multi-channel collision according to priorities of uplink channels.

As can be seen, before transmission of ACK/NACK information of a HARQ process, a process index of the HARQ process cannot be reused. When a HARQ process of URLLC adopts no-feedback DL transmission, according to an existing rule, the HARQ process cannot be reused, which decreases the maximum number of HARQ processes that are actually supported and thus affects data transmission rate. In addition, in the case where collision occurs to multiple uplink channels, if a priority of each uplink channel is determined through indication signaling transmitted by the base station, it will result in increase in indication signaling overhead. In order to solve the above technical problems, implementations provide the following solutions.

Implementations provide method for data transmissions and related devices, which can increase data transmission rate and reduce signaling overhead.

Figure 6:
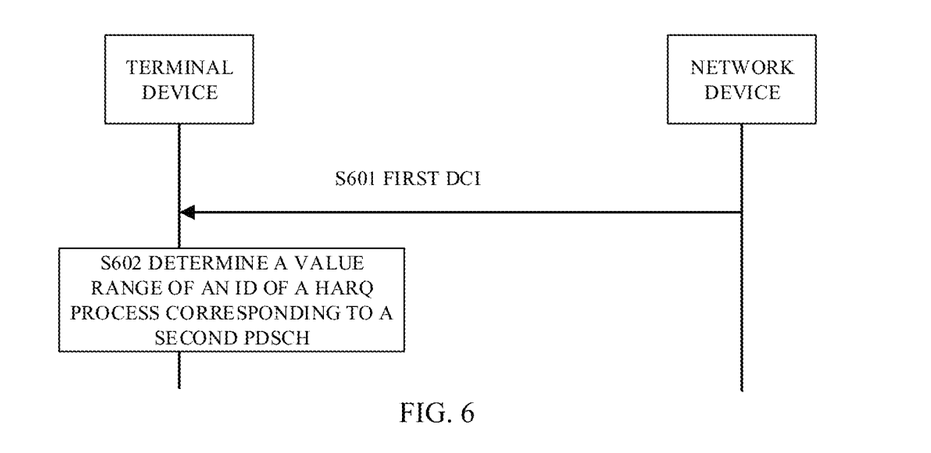
FIG. 6 is a schematic flowchart of a method for data transmission according to implementations.

FIG. 6 is a schematic flowchart of a method for data transmission according to implementations. As illustrated in FIG. 6, the method at least includes the following.

At block S601, a UE receives first DCI, where the first DCI is used for scheduling a first PDSCH. The first DCI includes a first information field, a value of the first information field includes a specific value or a non-specific value, and the specific value indicates that ACK/NACK information corresponding to the first PDSCH is transmitted according to a later trigger signal. That is, the specific value indicates temporarily not to transmit the ACK/NACK information corresponding to the first PDSCH, and the ACK/NACK information corresponding to the first PDSCH can be transmitted later according to a later trigger signal or trigger signaling. In some implementations, the first information field is a PDSCH-to-HARQ_feedback timing indicator information field. The non-specific value is any value in the PDSCH-to-HARQ_feedback timing indicator information field other than the specific value.

In practice, after receiving the first DCI, the UE can obtain the specific value from the PDSCH-to-HARQ_feedback timing indicator information field in the first DCI. The specific value may be a first specific value k. For example, the value of k may be set to be meaningless or infinity, to indicate that a PDSCH scheduled by DCI has no corresponding ACK/NACK information to be fed back. Alternatively, the specific value may also be a second specific value k which indicates that the UE temporarily does not transmit the ACK/NACK information corresponding to the first PDSCH. Subsequently, the UE can be triggered, through trigger signaling or a trigger signal, to feed back the ACK/NACK information corresponding to the first PDSCH, where the trigger signaling is used for instructing the UE to transmit the ACK/NACK information corresponding to the first PDSCH.

At block S602, the UE determines, according to the value the first information field, a value or a value range of a process index of a HARQ process corresponding to a second PDSCH received after reception of the first PDSCH.

In some implementations, the second PDSCH is transmitted before transmission of the ACK/NACK information corresponding to the first PDSCH. Alternatively, the second PDSCH is transmitted before transmission of the trigger signaling. In some implementations, the transmission of the trigger signaling is not earlier than that of the first DCI. For example, a start time of the trigger signaling is not earlier than a start time of the first DCI, or an end time of the trigger signaling is not earlier than the start time of the first DCI, or the start time of the trigger signaling is not earlier than the end time of the first DCI, or the end time of the trigger signaling is not earlier than that of the first DCI.

"The value of the first information field is the specific value" may mean that the first information field indicates the specific value, or the first information field carries the specific value. The value range of the process index of the HARQ process corresponding to the second PDSCH includes process indexes of some or all HARQ processes supported by the UE, which is defined in the following scenarios. In some implementations, the value range of the process index of the HARQ process corresponding to the second PDSCH includes a process index of an HARQ process corresponding to the first PDSCH. For example, the process index of the HARQ process corresponding to the second PDSCH is the same as the process index of the HARQ process corresponding to the first PDSCH.

As an example, the specific value indicates not to transmit the ACK/NACK information corresponding to the first PDSCH. The UE receives the second PDSCH after receiving the first PDSCH. The first PDSCH adopts a first HARQ process ID, and the second PDSCH can also adopt the first HARQ process ID. As such, when the first PDSCH has no corresponding ACK/NACK information to be fed back, the second PDSCH can continue to adopt the same HARQ process index as the first HARQ process ID, which can ensure transmission speed of a system. Alternatively, while the first PDSCH adopts the first HARQ process ID, the second PDSCH can adopt a second HARQ process ID, that is, the first PDSCH and the second PDSCH adopt different HARQ process IDs.

Figure 7:
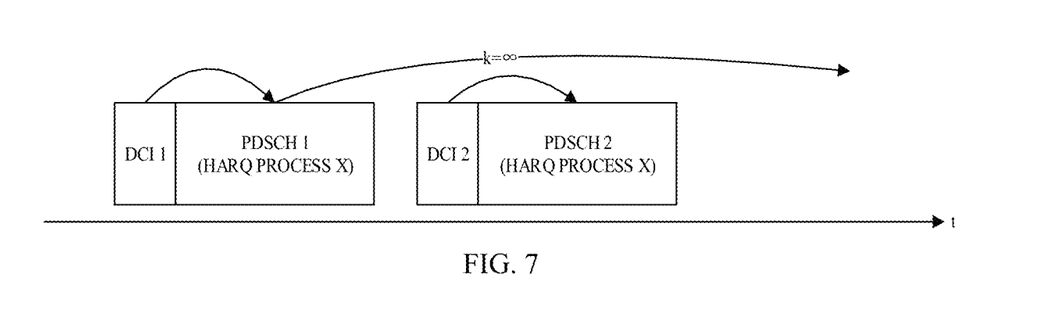
FIG. 7 is a schematic diagram illustrating data transmission according to implementations.

For example, as illustrated in FIG. 7, DCI 1 is used for scheduling PDSCH 1. DCI 2 is used for scheduling PDSCH 2. PDSCH 1 adopts HARQ process index X. Since a PDSCH-to-HARQ feedback timing indicator information field in DCI 1 indicates that specific value k is infinity or meaningless, before the UE feeds back to a network device ACK/NACK information corresponding to PDSCH 1 (that is, the first PDSCH), a process index of a HARQ process corresponding to PDSCH 2 received by the UE may be the same as that of a HARQ process corresponding to PDSCH 1, that is, PDSCH 2 can also adopt HARQ process index X.

Figure 8:
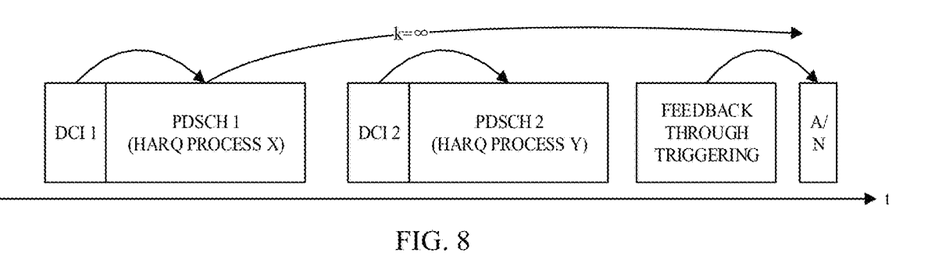
FIG. 8 is a schematic diagram illustrating data transmission according to other implementations.

As another example, the specific value indicates the ACK/NACK information corresponding to the first PDSCH is transmitted according to trigger signaling. The second PDSCH is transmitted before the transmission of the trigger signaling. The first PDSCH adopts the first HARQ process ID, and the second PDSCH adopts the second HARQ process ID, that is, the second PDSCH cannot adopt the same HARQ process index as the first PDSCH. For example, as illustrated in FIG. 8, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After PDSCH 1 is received and before the transmission of the trigger signaling, an process index of a HARQ process corresponding to PDSCH 2 received by the UE is different from that of a HARQ process corresponding to PDSCH 1, that is, PDSCH 2 adopts HARQ process index Y.

Figure 9:
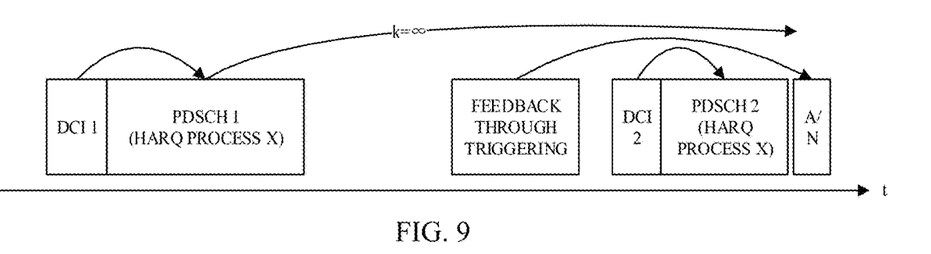
FIG. 9 is a schematic diagram illustrating data transmission according to other implementations.

As another example, the specific value indicates temporarily not to transmit the ACK/NACK information corresponding to the first PDSCH. The second PDSCH is transmitted after the transmission of the trigger signaling and before the transmission of the ACK/NACK information corresponding to the first PDSCH. The first PDSCH adopts the first HARQ process ID, and the second PDSCH can also adopt the first HARQ process ID. As such, the process index of the HARQ process corresponding to the first PDSCH can continue to be adopted before feedback of the ACK/NACK information corresponding to the first PDSCH, thereby ensuring data transmission rate. Alternatively, the second PDSCH can adopt a HARQ process index which is different from the process index of the HARQ process corresponding to the first PDSCH. As illustrated in FIG. 9, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After the transmission of the trigger signaling and before the UE transmits the ACK/NACK information to the network device, a process index of a HARQ process corresponding to PDSCH 2 received by the UE can be the same as that of a HARQ process corresponding to PDSCH 1, that is, PDSCH 2 can also adopt HARQ process index X.

In some implementations, when the value of the first information field is the non-specific value, the value range of the process index of the HARQ process corresponding to the second PDSCH includes process indexes of all HARQ processes supported by the UE other than the index of the HARQ process corresponding to the first PDSCH. For example, when the value of the first information domain is the non-specific value, the value range of the index of the HARQ process corresponding to the second PDSCH, the process index of the HARQ process corresponding to the second PDSCH is different from the process index of the HARQ process corresponding to the first PDSCH. The UE receives the second PDSCH after receiving the first PDSCH. The first PDSCH adopts the first HARQ process ID, and the second PDSCH adopts a non-first HARQ process index (that is, a HARQ process index other than the first HARQ process index), that is, the first PDSCH and the second PDSCH adopt different HARQ process IDs.

Figure 10:
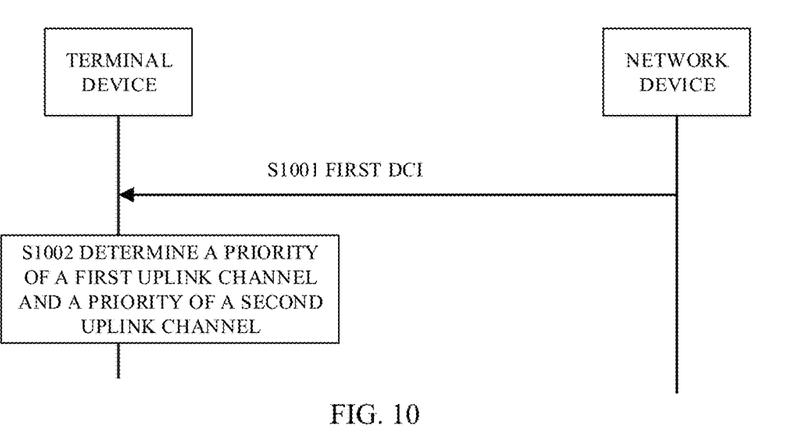
FIG. 10 is a schematic flowchart of a method for data transmission according to other implementations.

FIG. 10 is a schematic flowchart of a method for data transmission according to other implementations. As illustrated in FIG. 10, the method at least includes the following.

At block S1001, a UE receives first DCI, where the first DCI is used for scheduling a first PDSCH, the first DCI includes a first information field, a value of the first information field includes a first specific value or a non-first specific value, and the first specific value indicates not to transmit ACK/NACK information corresponding to the first PDSCH or temporarily not to transmit ACK/NACK information corresponding to the first PDSCH. In one implementation, the first specific value indicates that the ACK/NACK information corresponding to the first PDSCH is transmitted according to a later trigger signal. The first information field is a PDSCH-to-HARQ_feedback timing indicator information field. The non-first specific value is any one value in the PDSCH-to-HARQ_feedback timing indicator information field other than the first specific value.

In practice, after receiving the first DCI, the UE can obtain a specific value from the PDSCH-to-HARQ_feedback timing indicator information field in the first DCI. The specific value may be the first specific value k. For example, the specific value may be set to be meaningless or infinity, to indicate that a PDSCH scheduled by DCI has no corresponding ACK/NACK information to be fed back. Alternatively, the specific value may be a second specific value k which indicates that the UE temporarily does not transmit the ACK/NACK information corresponding to the first PDSCH. Subsequently, the UE can be triggered, through trigger signaling, to feed back the ACK/NACK information corresponding to the first PDSCH, where the trigger signaling is used for instructing the UE to transmit the ACK/NACK information corresponding to the first PDSCH.

At block S1002, the UE determines, according to the value of the first information field, a priority of a first uplink channel corresponding to the first PDSCH and a priority of a second uplink channel, when the first uplink channel at least partially overlaps with the second uplink channel in time domain.

The UE can determine the priority of the first uplink channel and the priority of the second uplink channel according to the first specific value of the first information field.

In some implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value of the second information field is indicative of transmission of the second uplink channel, and the second information field is a PDSCH-to-HARQ_feedback timing indicator information field. When the value of the second information field is not a second specific value and the value of the first information field includes the non-first specific value, the UE can determine that the first uplink channel has higher priority, where the second specific value indicates not to transmit the ACK/NACK information corresponding to the second PDSCH or temporarily not to transmit the ACK/NACK information corresponding to the second PDSCH. In this way, a priority of each uplink channel can be determined, which is possible to avoid increase in additional overhead of control signaling.

In other implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value of the second information field is indicative of transmission of the second uplink channel, and the second information field is a PDSCH-to-HARQ_feedback timing indicator information field. When the value of the second information field is a second specific value and the value of the first information field is the first specific value, the UE can determine that the first uplink channel has higher priority, where the first specific value indicates not to transmit the ACK/NACK information corresponding to the first PDSCH, and the second specific value indicates temporarily not to transmit the ACK/NACK information corresponding to the second PDSCH. As such, it is possible to determine a priority of each uplink channel, which can avoid increase in additional overhead of control signaling.

In some implementations, the UE can determine the priority of the first uplink channel and the priority of the second uplink channel according to the first information field and transmission of the first DCI. In some implementations, when the first DCI is transmitted after transmission of the second DCI and the value of the first information field includes the non-first specific value, the UE can determine that the first uplink channel has higher priority, where the second DCI corresponds to the second uplink channel. Alternatively, a priority indicated by the second DCI corresponding to the second uplink channel is the same as that indicated by the first DCI corresponding to the first uplink channel. In this way, a priority of each uplink channel can be determined, which is possible to avoid increase in additional overhead of control signaling.

After the priority of the first uplink channel and the priority of the second uplink channel are determined, if the priority of the first uplink channel is higher than that of the second uplink channel, the UE can transmit only the first uplink channel without transmitting the second uplink channel, or stop transmitting the second uplink channel. If the priority of the first uplink channel is the same as that of the second uplink channel, the UE can multiplex information carried in the first uplink channel and information carried in the second uplink channel, and transmit the multiplexed information on one uplink channel. However, during multiplexing transmission, it is necessary to ensure that all information carried in the first uplink channel is successfully transmitted. If the priority of the first uplink channel is lower than that of the second uplink channel, the UE can transmit only the second uplink channel without transmitting the first uplink channel, or stop transmitting the first uplink channel. As such, it is possible to save signaling overhead. Data transmission performed according to a priority of each uplink channel will not be elaborated herein.

Figure 11:
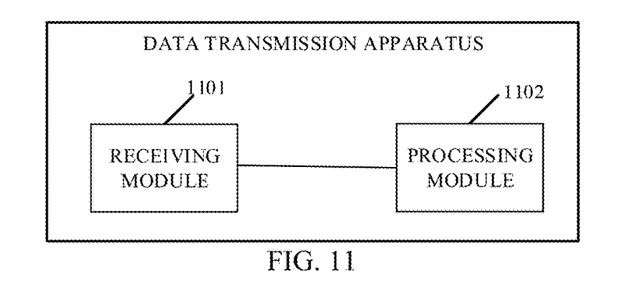
FIG. 11 is a schematic structural diagram of a data transmission apparatus according to implementations.

FIG. 11 is a schematic structural diagram of a data transmission apparatus according to implementations. As illustrated in FIG. 11, the apparatus at least includes a receiving module 1101 and a processing module 1102.

The receiving module 1101 is configured to receive first DCI, where the first DCI is used for scheduling a first PDSCH, the first DCI includes a first information field, a value of the first information field includes a specific value or a non-specific value, and the specific value indicates not to transmit ACK/NACK information corresponding to the first PDSCH or temporarily not to transmit ACK/NACK information corresponding to the first PDSCH. The first information field is a PDSCH-to-HARQ_feedback timing indicator information field. The non-specific value is any value in the PDSCH-to-HARQ_feedback timing indicator information field other than the specific value.

In practice, after receiving the first DCI, a UE can obtain the specific value from the PDSCH-to-HARQ_feedback timing indicator information field in the first DCI. The specific value may be a first specific value k. For example, the value of k may be set to be meaningless or infinity, to indicate that a PDSCH scheduled by DCI has no corresponding ACK/NACK information to be fed back. Alternatively, the specific value may also be a second specific value k which indicates that the UE temporarily does not transmit the ACK/NACK information corresponding to the first PDSCH. Subsequently, the UE can be triggered, through trigger signaling, to feed back the ACK/NACK information corresponding to the first PDSCH, where the trigger signaling is used for instructing the UE to transmit the ACK/NACK information corresponding to the first PDSCH.

The processing module 1102 is configured to determine, according to the value of the first information field, a value or a value range of a process index of a HARQ process corresponding to a second PDSCH received after reception of the first PDSCH.

In some implementations, the second PDSCH is transmitted before transmission of the ACK/NACK information corresponding to the first PDSCH. Alternatively, the second PDSCH is transmitted before transmission of the trigger signaling. The transmission of the trigger signaling is not earlier than that of the first DCI. For example, a start time of the trigger signaling is not earlier than a start time of the first DCI, or an end time of the trigger signaling is not earlier than the start time of the first DCI, or the start time of the trigger signaling is not earlier than the start time of the first DCI, or the end time of the trigger signaling is not earlier than that of the first DCI.

"The value of the first information field is the specific value" may mean that the first information field indicates the specific value, or the first information field carries the specific value. The value range of the process index of the HARQ process corresponding to the second PDSCH includes process indexes of some or all HARQ processes supported by the UE, which is defined in the following scenarios.

As an example, the specific value indicates not to transmit the ACK/NACK information corresponding to the first PDSCH. The UE receives the second PDSCH after receiving the first PDSCH. The first PDSCH adopts a first HARQ process ID, and the second PDSCH can also adopt the first HARQ process ID. As such, when the first PDSCH has no corresponding ACK/NACK information to be fed back, the second PDSCH can continue to adopt the same HARQ process index as the first HARQ process ID, which can ensure transmission speed of a system. Alternatively, while the first PDSCH adopts the first HARQ process ID, the second PDSCH can adopt a second HARQ process ID, that is, the first PDSCH and the second PDSCH adopt different HARQ process IDs.

For example, as illustrated in FIG. 7, DCI 1 is used for scheduling PDSCH 1. DCI 2 is used for scheduling PDSCH 2. PDSCH 1 adopts HARQ process index X. Since a PDSCH-to-HARQ_feedback timing indicator information field in DCI 1 indicates that specific value k is infinity or meaningless, before the UE feeds back to a network device ACK/NACK information corresponding to PDSCH 1 (that is, the first PDSCH), an index of a HARQ process corresponding to PDSCH 2 received by the UE may be the same as that of a HARQ process corresponding to PDSCH 1, that is, PDSCH 2 can also adopt HARQ process index X.

As another example, the specific value indicates temporarily not to transmit the ACK/NACK information corresponding to the first PDSCH. The second PDSCH is transmitted before the transmission of the trigger signaling. The first PDSCH adopts the first HARQ process ID, and the second PDSCH adopts the second HARQ process ID, that is, the second PDSCH cannot adopt the same HARQ process index as the first PDSCH. For example, as illustrated in FIG. 8, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After PDSCH 1 is received and before the transmission of the trigger signaling, a process index of a HARQ process corresponding to PDSCH 2 received by the UE is different from that of a HARQ process corresponding to PDSCH 1, that is, PDSCH 2 adopts HARQ process index Y.

As another example, the specific value indicates temporarily not to transmit the ACK/NACK information corresponding to the first PDSCH. The second PDSCH is transmitted after the transmission of the trigger signaling and before the transmission of the ACK/NACK information corresponding to the first PDSCH. The first PDSCH adopts the first HARQ process ID, and the second PDSCH can also adopt the first HARQ process ID. As such, the index of HARQ process corresponding to the first PDSCH can continue to be adopted before feedback of the ACK/NACK information corresponding to the first PDSCH, thereby ensuring data transmission rate. Alternatively, the second PDSCH can adopt a HARQ process index which is different from the index of the HARQ process corresponding to the first PDSCH. As illustrated in FIG. 9, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After the transmission of the trigger signaling and before the UE transmits the ACK/NACK information to the network device, an index of a HARQ process corresponding to PDSCH 2 received by the UE can be the same as that of a HARQ process corresponding to PDSCH 1, that is, PDSCH 2 can also adopt HARQ process index X.

In some implementations, when the value of the first information field is the non-specific value, the value range of the index of the HARQ process corresponding to the second PDSCH includes IDs of all HARQ processes supported by the UE other than the index of the HARQ process corresponding to the first PDSCH. The UE receives the second PDSCH after receiving the first PDSCH. The first PDSCH adopts the first HARQ process ID, and the second PDSCH adopts a non-first HARQ process ID, that is, the first PDSCH and the second PDSCH adopt different HARQ process IDs.

In other implementations, the receiving module 1101 is configured to receive first DCI, where the first DCI is used for scheduling a first PDSCH, the first DCI includes a first information field, the value of the first information field includes a first specific value or a non-first specific value, and the first specific value indicates not to transmit ACK/NACK information corresponding to the first PDSCH or temporarily not to transmit ACK/NACK information corresponding to the first PDSCH. The first information field is a PDSCH-to-HARQ_feedback timing indicator information field. The non-first specific value is any one value in the PDSCH-to-HARQ_feedback timing indicator information field other than the first specific value.

In practice, after receiving the first DCI, the UE can obtain a specific value from the PDSCH-to-HARQ_feedback timing indicator information field in the first DCI. The specific value may be the first specific value k. For example, the specific value may be meaningless or infinity, to indicate that a PDSCH scheduled by DCI has no corresponding ACK/NACK information to be fed back. Alternatively, the specific value may be a second specific value k which indicates that the UE temporarily does not transmit the ACK/NACK information corresponding to the first PDSCH. Subsequently, the UE can be triggered, through trigger signaling, to feed back the ACK/NACK information corresponding to the first PDSCH, where the trigger signaling is used for instructing the UE to transmit the ACK/NACK information corresponding to the first PDSCH.

The processing module 1102 is configured to determine, according to the value of the first information field, a priority of a first uplink channel corresponding to the first PDSCH and a priority of a second uplink channel, when the first uplink channel at least partially overlaps with the second uplink channel in time domain.

The processing module 1102 can determine the priority of the first uplink channel and the priority of the second uplink channel according to the first specific value indicated by the first information field.

In some implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value indicated by the second information field is indicative of transmission of the second uplink channel, and the second information field is a PDSCH-to-HARQ feedback timing indicator information field. The processing module 1102 is configured to determine that the first uplink channel has higher priority, when the value of the second information field is not the second specific value and the value of the first information field is the non-first specific value, where the second specific value indicates not to transmit the ACK/NACK information corresponding to the second PDSCH or temporarily not to transmit the ACK/NACK information corresponding to the second PDSCH. In this way, a priority of each uplink channel can be determined, which is possible to avoid increase in additional overhead of control signaling.

In other implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value of the second information field is indicative of transmission of the second uplink channel, and the second information field is a PDSCH-to-HARQ_feedback timing indicator information field. The processing module 1102 is configured to determine that the first uplink channel has higher priority, when the value of the second information field is a second specific value and the value of the first information field is the first specific value, where the first specific value indicates not to transmit the ACK/NACK information corresponding to the first PDSCH, and the second specific value indicates temporarily not to transmit the ACK/NACK information corresponding to the second PDSCH. As such, by determining a priority of each uplink channel, it is possible to avoid increase in additional overhead of control signaling.

In some implementations, the processing module 1102 is configured to determine the priority of the first uplink channel and the priority of the second uplink channel according to the first information field and transmission of the first DCI. In some implementations, the processing module 1102 is configured to determine that the first uplink channel has higher priority, when the first DCI is transmitted after transmission of the second DCI and the value of the first information field is the non-first specific value, where the second DCI corresponds to the second uplink channel. Alternatively, a priority indicated by the second DCI corresponding to the second uplink channel is the same as that indicated by the first DCI corresponding to the first uplink channel. In this way, a priority of each uplink channel can be determined, which can avoid increase in additional overhead of control signaling.

After the priority of the first uplink channel and the priority of the second uplink channel are determined, if the priority of the first uplink channel is higher than that of the second uplink channel, the UE can transmit only the first uplink channel without transmitting the second uplink channel, or stop transmitting the second uplink channel. If the priority of the first uplink channel is the same as that of the second uplink channel, the UE can multiplex information carried in the first uplink channel and information carried in the second uplink channel, and transmit the multiplexed information on one uplink channel. However, during multiplexing transmission, it is necessary to ensure that all information carried in the first uplink channel is successfully transmitted. If the priority of the first uplink channel is lower than that of the second uplink channel, the UE can transmit only the second uplink channel without transmitting the first uplink channel, or stop transmitting the first uplink channel. As such, it is possible to save signaling overhead. Data transmission performed according to a priority of each uplink channel will not be elaborated herein.

Figure 12:
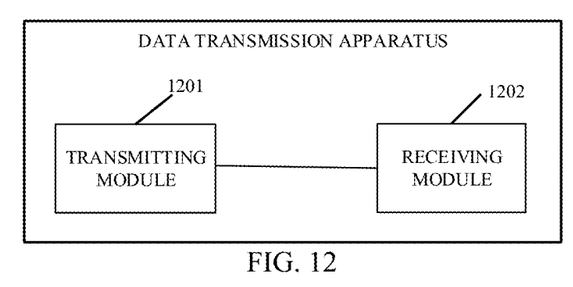
FIG. 12 is a schematic structural diagram of a data transmission apparatus according to other implementations.

FIG. 12 is a schematic structural diagram of a data transmission apparatus according to other implementations. As illustrated in FIG. 12, the apparatus at least includes a transmitting module 1201. The transmitting module 1201 is configured to transmit first DCI to a UE, where the first DCI is used for scheduling a first PDSCH, the first DCI includes a first information field, the value of the first information field includes a specific value or a non-specific value, the specific value indicates not to transmit ACK/NACK information corresponding to the first PDSCH or temporarily not to transmit ACK/NACK information corresponding to the first PDSCH, and the first information field is used for instructing the UE to determine a value or a value range of an index of a HARQ process corresponding to a second PDSCH received after reception of the first PDSCH. The non-specific value is any value in a PDSCH-to-HARQ_feedback timing indicator information field other than the specific value.

The specific value may be a first specific value k. For example, the value of k may be set to be meaningless or infinity, to indicate that a PDSCH scheduled by DCI has no corresponding ACK/NACK information to be fed back. Alternatively, the specific value may also be a second specific value k which indicates that the UE temporarily does not transmit the ACK/NACK information corresponding to the first PDSCH. Subsequently, the UE can be triggered, through trigger signaling, to feed back the ACK/NACK information corresponding to the first PDSCH, where the trigger signaling is used for instructing the UE to transmit the ACK/NACK information corresponding to the first PDSCH.

In some implementations, the second PDSCH is transmitted before transmission of the ACK/NACK information corresponding to the first PDSCH. Alternatively, the second PDSCH is transmitted before transmission of the trigger signaling. In some implementations, the transmission of the trigger signaling is not earlier than that of the first DCI. For example, a start time of the trigger signaling is not earlier than a start time of the first DCI, or an end time of the trigger signaling is not earlier than the start time of the first DCI, or the start time of the trigger signaling is not earlier than the start time of the first DCI, or the end time of the trigger signaling is not earlier than that of the first DCI.

"The value of the first information field is the specific value" may mean that the first information field indicates the specific value, or the first information field carries the specific value. The value range of the index of the HARQ process corresponding to the second PDSCH includes IDs of some or all HARQ processes supported by the UE, which is defined in the following scenarios.

As an example, the specific value indicates not to transmit the ACK/NACK information corresponding to the first PDSCH. A network device transmits the second PDSCH after transmitting the first PDSCH. The first PDSCH adopts a first HARQ process ID, and the second PDSCH can also adopt the first HARQ process ID. As such, when the first PDSCH has no corresponding ACK/NACK information to be fed back, the second PDSCH can continue to adopt the same HARQ process index as the first HARQ process ID, which can ensure transmission speed of a system. Alternatively, while the first PDSCH adopts the first HARQ process ID, the second PDSCH can adopt a second HARQ process ID, that is, the first PDSCH and the second PDSCH adopt different HARQ process IDs.

For example, as illustrated in FIG. 7, DCI 1 is used for scheduling PDSCH 1. DCI 2 is used for scheduling PDSCH 2. PDSCH 1 adopts HARQ process index X. Since a PDSCH-to-HARQ_feedback timing indicator information field in DCI 1 indicates that specific value k is infinity or meaningless, before the UE feeds back to the network device ACK/NACK information corresponding to PDSCH 1 (that is, the first PDSCH), an index of a HARQ process corresponding to PDSCH 2 transmitted by the network device may be the same as that of a HARQ process corresponding to PDSCH 1, that is, PDSCH 2 can also adopt HARQ process index X.

As another example, the specific value indicates temporarily not to transmit the ACK/NACK information corresponding to the first PDSCH. The second PDSCH is transmitted before the transmission of the trigger signaling. The first PDSCH adopts the first HARQ process ID, and the second PDSCH adopts the second HARQ process ID, that is, the second PDSCH cannot adopt the same HARQ process index as the first PDSCH. For example, as illustrated in FIG. 8, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After the UE receives PDSCH 1 and before the transmission of the trigger signaling, an index of a HARQ process corresponding to PDSCH 2 received by the UE is different from that of a HARQ process corresponding to PDSCH 1, that is, PDSCH 2 adopts HARQ process index Y.

As another example, the specific value indicates temporarily not to transmit the ACK/NACK information corresponding to the first PDSCH. The second PDSCH is transmitted after the transmission of the trigger signaling and before the transmission of the ACK/NACK information corresponding to the first PDSCH. The first PDSCH adopts the first HARQ process ID, and the second PDSCH can also adopt the first HARQ process ID. As such, the index of the HARQ process corresponding to the first PDSCH can continue to be adopted before feedback of the ACK/NACK information corresponding to the first PDSCH, thereby ensuring data transmission rate. Alternatively, the second PDSCH can adopt a HARQ process index which is different from the index of the HARQ process corresponding to the first PDSCH. As illustrated in FIG. 9, DCI 1 is used for scheduling PDSCH 1. DCI 2 is used for scheduling PDSCH 2. PDSCH 1 adopts HARQ process index X. The ACK/NACK information corresponding to the first PDSCH (that is, PDSCH 1) is temporarily not transmitted. Transmission of the ACK/NACK information is triggered by the trigger signaling. After the transmission of the trigger signaling and before the UE transmits the ACK/NACK information to the network device, an index of a HARQ process corresponding to PDSCH 2 received by the UE can be the same as that of a HARQ process corresponding to PDSCH 1, that is, PDSCH 2 can also adopt HARQ process index X.

In some implementations, when the value of the first information field is the non-specific value, the value range of the index of the HARQ process corresponding to the second PDSCH includes IDs of all HARQ processes supported by the UE other than the index of the HARQ process corresponding to the first PDSCH. The UE receives the second PDSCH after receiving the first PDSCH. The first PDSCH adopts the first HARQ process ID, and the second PDSCH adopts a non-first HARQ process ID, that is, the first PDSCH and the second PDSCH adopt different HARQ process IDs.

The apparatus further includes a receiving module 1202. The receiving module 1202 is configured to receive ACK/NACK information corresponding to the second PDSCH, where the ACK/NACK information corresponding to the second PDSCH is transmitted by the UE according to the value or the value range of the index of the HARQ process corresponding to the second PDSCH.

In practice, when the specific value indicates not to transmit the ACK/NACK information corresponding to the first PDSCH, the ACK/NACK information corresponding to the second PDSCH, which is transmitted by the UE by using the same HARQ process index as the index of the HARQ process corresponding to the first PDSCH, can be received. When the specific value indicates temporarily not to transmit the ACK/NACK information corresponding to the first PDSCH, if the second PDSCH is transmitted before the transmission of the trigger signaling, the ACK/NACK information corresponding to the second PDSCH, which is transmitted by the UE by using a HARQ process index that is different from the index of the HARQ process corresponding to the first PDSCH, can be received. When the specific value indicates temporarily not to transmit the ACK/NACK information corresponding to the first PDSCH, if the second PDSCH is transmitted after the transmission of the trigger signaling and before the transmission of the ACK/NACK information corresponding to the first PDSCH, the ACK/NACK information corresponding to the second PDSCH, which is transmitted by the UE by using the same HARQ process index as the index of the HARQ process corresponding to the first PDSCH, can be received.

In other implementations, the transmitting module 1201 is configured to transmit first DCI to a UE, where the first DCI is used for scheduling a first PDSCH, the first DCI includes a first information field, the value of the first information field includes a first specific value or a non-first specific value, the first specific value indicates not to transmit ACK/NACK information corresponding to the first PDSCH or temporarily not to transmit ACK/NACK information corresponding to the first PDSCH, and the first information field is used for instructing the UE to determine a priority of a first uplink channel corresponding to the first PDSCH and a priority of a second uplink channel when the first uplink channel at least partially overlaps with the second uplink channel in time domain. The non-first specific value is any one value in a PDSCH-to-HARQ feedback timing indicator information field other than the first specific value.

The specific value may be the first specific value k. For example, the specific value may be meaningless or infinity, to indicate that a PDSCH scheduled by DCI has no corresponding ACK/NACK information to be fed back. Alternatively, the specific value may be a second specific value k which indicates that the UE temporarily does not transmit the ACK/NACK information corresponding to the first PDSCH. Subsequently, the UE can be triggered, through trigger signaling, to feed back the ACK/NACK information corresponding to the first PDSCH, where the trigger signaling is used for instructing the UE to transmit the ACK/NACK information corresponding to the first PDSCH.

In some implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value of the second information field is indicative of transmission of the second uplink channel, and the second information field is a PDSCH-to-HARQ_feedback timing indicator information field. When the value of the second information field is not the second specific value and the value of the first information field is the non-first specific value, the first uplink channel has higher priority, where the second specific value indicates not to transmit the ACK/NACK information corresponding to the second PDSCH or temporarily not to transmit the ACK/NACK information corresponding to the second PDSCH. In this way, a priority of each uplink channel can be determined, which is possible to avoid increase in additional overhead of control signaling.

In other implementations, the second uplink channel is used for carrying ACK/NACK information corresponding to a second PDSCH, the second PDSCH is scheduled by second DCI, the second DCI can be transmitted before transmission of the first DCI, the second DCI includes a second information field, a value of the second information field is indicative of transmission of the second uplink channel, and the second information field is a PDSCH-to-HARQ_feedback timing indicator information field. When the value of the second information field is a second specific value and the value of the first information field is the first specific value, the first uplink channel has higher priority, where the first specific value indicates not to transmit the ACK/NACK information corresponding to the first PDSCH, and the second specific value indicates temporarily not to transmit the ACK/NACK information corresponding to the second PDSCH. In this way, it is possible to determine a priority of each uplink channel, which can avoid increase in additional overhead of control signaling.

In some implementations, the priority of the first uplink channel and the priority of the second uplink channel are determined according to the first information field and transmission of the first DCI. In some implementations, when the first DCI is transmitted after transmission of second DCI and the value of the first information field is the non-first specific value, the first uplink channel has higher priority, where the second DCI corresponds to the second uplink channel. Alternatively, a priority indicated by the second DCI corresponding to the second uplink channel is the same as that indicated by the first DCI corresponding to the first uplink channel. In this way, the UE can determine a priority of each uplink channel, which is possible to avoid increase in additional overhead of control signaling.

The receiving module 1202 is further configured to receive ACK/NACK information that is transmitted by the UE according to the priority of the first uplink channel and the priority of the second uplink channel.

In practice, after the priority of the first uplink channel and the priority of the second uplink channel are determined, if the priority of the first uplink channel is higher than that of the second uplink channel, ACK/NACK information carried in the first uplink channel, which is transmitted by the UE, can be received. The UE may not transmit the second uplink channel, or may stop transmitting the second uplink channel. If the priority of the first uplink channel is the same as that of the second uplink channel, the first uplink channel and the second uplink channel can be multiplexed, and ACK/NACK information carried in the multiplexed uplink channel, which is transmitted by the UE, can be received. If the priority of the first uplink channel is lower than that of the second uplink channel, ACK/NACK information carried in the second uplink channel, which is transmitted by the UE, can be received. The UE may not transmit the first uplink channel, or may stop transmitting the first uplink channel. As such, it is possible to save signaling overhead.

For the implementation of each of the foregoing module, reference can be made to related descriptions in the method implementations illustrated in FIG. 6 and FIG. 10, to implement the operations and functions performed by the network device in the foregoing implementations.

Figure 13:
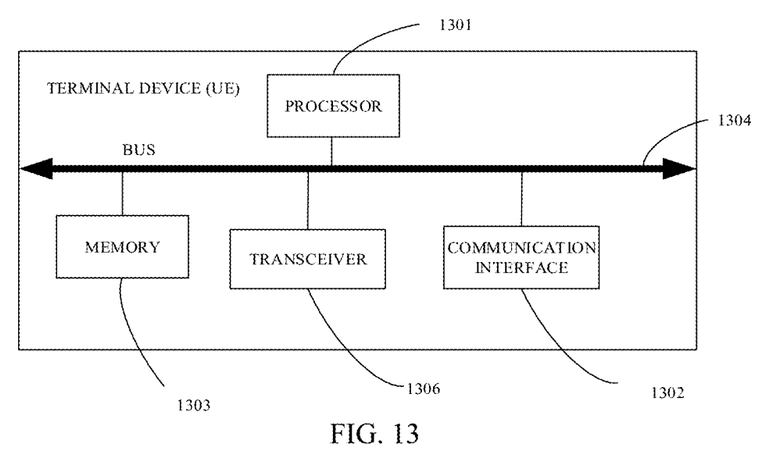
FIG. 13 is a schematic structural diagram of a user equipment (UE) according to implementations.

FIG. 13 is a schematic structural diagram of a UE according to implementations. As illustrated in FIG. 13, the UE includes at least one processor 1301, at least one communication interface 1302, at least one memory 1303, at least one communication bus 1304, and at least one transceiver 1306.

The processor 1301 may implement or execute various exemplary logical blocks, modules, and circuits described with reference to the implementations herein. The processor may be a combination for implementing a computing function, for example, a combination of one or more microprocessors, or a combination of digital signal processor (DSP) and microprocessor. The communication bus 1304 may be a peripheral component interconnect (PCI) bus, or an extended industry standard architecture (EISA) bus, or the like. The bus may include an address bus, a data bus, a control bus, etc. For the convenience of illustration, in FIG. 13, only one bold line is used for representing the bus, but it does not mean that there is only one bus or only one type of bus. The communication bus 1304 is configured for connection and communication between these components. The transceiver 1306 of the UE of implementations is configured to perform signaling communication or data communication with another node device through the communication interface 1302. The memory 1303 may include a volatile memory, for example, a nonvolatile random access memory (NVRAM), a phase change RAM (PRAM), a magetoresistive RAM (MRAM), etc. The memory 1303 may further include a non-volatile memory, for example, at least one magnetic-disk storage device, an electrically erasable programmable read-only memory (EEPROM), a flash memory device (such as a NOR flash memory or a NAND flash memory), a semiconductor device (such as a solid state disk (SSD), etc. The memory 1303 may also be at least one storage device that is located away from the processor 1301. The memory 1303 may be configured to store a group of program codes, and the processor 1301 and the transceiver 1306 may be configured to execute programs in the memory 1303 executed by the UE.

The transceiver 1306 is configured to receive first DCI via the communication interface 1302, where the first DCI is used for scheduling a first PDSCH, the first DCI includes a first information field, a value of the first information field includes a specific value or a non-specific value, and the specific value indicates that ACK/NACK information corresponding to the first PDSCH is transmitted according to a later trigger signal. The processor 1301 is configured to determine, according to the first information field, a value or a value range of an index of a HARQ process corresponding to a second PDSCH received after reception of the first PDSCH.

In some implementations, when the value of the first information field is the specific value, the value range of the index of the HARQ process corresponding to the second PDSCH includes an index of an HARQ process corresponding to the first PDSCH.

In some implementations, the index of the HARQ process corresponding to the second PDSCH is the same as the index of the HARQ process corresponding to the first PDSCH.

In other implementations, when the value of the first information field is the non-specific value, the value range of the index of the HARQ process corresponding to the second PDSCH includes IDs of all HARQ processes supported by the UE other than an index of a HARQ process corresponding to the first PDSCH.

In other implementations, when the first information domain is the non-specific value, the index of the HARQ process corresponding to the second PDSCH is different from the index of the HARQ process corresponding to the first PDSCH.

In some implementations, the second PDSCH is transmitted before transmission of the ACK/NACK information corresponding to the first PDSCH. Alternatively, the second PDSCH is transmitted before transmission of trigger signaling, where the trigger signaling is used for instructing the UE to transmit the ACK/NACK information corresponding to the first PDSCH.

In some implementations, the transmission of the trigger signaling is not earlier than transmission of the first DCI.

In some implementations, the first information field is a PDSCH-to-HARQ_feedback timing indicator information field.

In some implementations, the transmission of the ACK/NACK information corresponding to the first PDSCH is determined according to a value of the first information field.

In other implementations, the processor 1301 is configured to operate as follows. The processor 1301 is configured to receive first DCI via the communication interface 1302, where the first DCI is used for scheduling a first PDSCH, the first DCI includes a first information field, the value of the first information field includes a first specific value or a non-first specific value, and the first specific value indicates not to transmit ACK/NACK information corresponding to the first PDSCH or temporarily not to transmit ACK/NACK information corresponding to the first PDSCH. The processor 1301 is configured to determine, according to the first information field, a priority of a first uplink channel corresponding to the first PDSCH and a priority of a second uplink channel, when the first uplink channel at least partially overlaps with the second uplink channel in time domain.

In some implementations, the processor 1301 is configured to determine, according to the first information field and transmission of the first DCI, the priority of the first uplink channel and the priority of the second uplink channel.

In some implementations, the processor 1301 is configured to determine that the first uplink channel has higher priority, when the first DCI is transmitted after transmission of second DCI and the value of the first information field is the non-first specific value, where the second DCI corresponds to the second uplink channel.

In some implementations, the processor 1301 is configured to determine that the first uplink channel has higher priority, when the value of the second information field is not the second specific value and the value of the first information field is the non-first specific value, where the second specific value indicates not to transmit the ACK/NACK information corresponding to the second PDSCH or temporarily not to transmit the ACK/NACK information corresponding to the second PDSCH.

In other implementations, the processor 1301 is configured to determine that the first uplink channel has higher priority, when the value of the second information field is a second specific value and the value of the first information field is the first specific value, where the first specific value indicates not to transmit the ACK/NACK information corresponding to the first PDSCH, and the second specific value indicates temporarily not to transmit the ACK/NACK information corresponding to the second PDSCH.

The processor may also cooperate with the memory and the communication interface to implement operations performed by the UE in the foregoing implementations.

Figure 14:
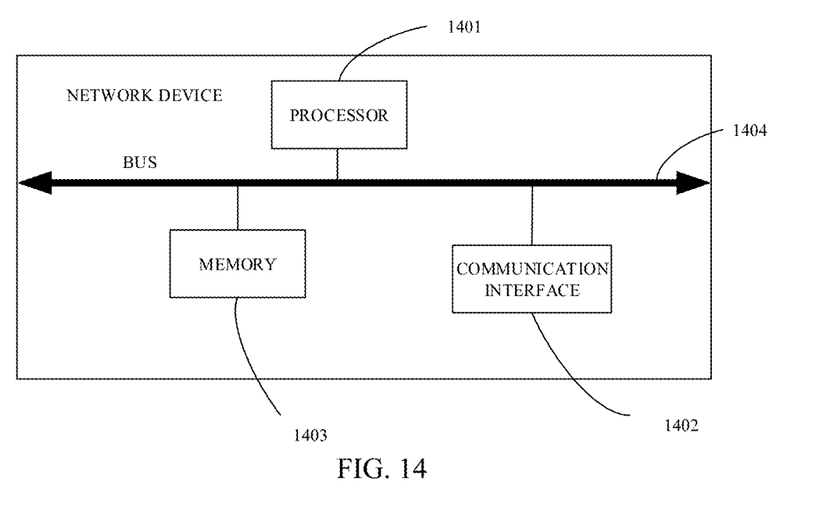
FIG. 14 is a schematic structural diagram of a network device according to implementations.

FIG. 14 is a schematic structural diagram of a network device according to implementations. As illustrated in FIG. 14, the network device includes at least one processor 1401, at least one communication interface 1402, at least one memory 1403, and at least one communication bus 1404.

The processor 1401 may be the various types of processors mentioned above. The communication bus 1404 may be a PCI bus, or an EISA bus, or the like. The bus may include an address bus, a data bus, a control bus, etc. For the convenience of illustration, in FIG. 14, only one bold line is used for representing the bus, but it does not mean that there is only one bus or only one type of bus. The communication bus 1404 is configured for connection and communication between these components. The communication interface 1402 of the network device of implementations is configured to perform signaling communication or data communication with another node device. The memory 1403 may be the various type of memories described above. The memory 1403 may also be at least one storage device that is located away from the processor 1401. The memory 1403 may be configured to store a group of program codes, and the processor 1401 may be configured to execute programs in the memory 1403 executed by the network device.

The processor 1401 is configured to transmit, via the communication interface 1402, first DCI to a UE, where the first DCI is used for scheduling a first PDSCH, the first DCI includes a first information field, a value of the first information field includes a specific value or a non-specific value, the specific value indicates not to transmit ACK/NACK information corresponding to the first PDSCH or temporarily not to transmit ACK/NACK information corresponding to the first PDSCH, and the first information field is used for instructing the UE to determine a value or a value range of an index of a HARQ process corresponding to a second PDSCH received after reception of the first PDSCH.

In some implementations, when the value of the first information field is the specific value, the value range of the index of the HARQ process corresponding to the second PDSCH includes IDs of all HARQ processes supported by the UE.

In other implementations, when the value of the first information field is the non-specific value, the value range of the index of the HARQ process corresponding to the second PDSCH includes IDs of all HARQ processes supported by the UE other than an index of a HARQ process corresponding to the first PDSCH.

In some implementations, the second PDSCH is transmitted before transmission of the ACK/NACK information corresponding to the first PDSCH. Alternatively, the second PDSCH is transmitted before transmission of trigger signaling, where the trigger signaling is used for instructing the UE to transmit the ACK/NACK information corresponding to the first PDSCH.

In some implementations, the transmission of the trigger signaling is not earlier than transmission of the first DCI.

In some implementations, the first information field is a PDSCH-to-HARQ_feedback timing indicator information field.

In some implementations, the transmission of the ACK/NACK information corresponding to the first PDSCH is determined according to a value of the first information field.

In other implementations, the processor 1401 is configured to transmit, via the communication interface 1402, first DCI to a UE, where the first DCI is used for scheduling a first PDSCH, the first DCI includes a first information field, a value of the first information field includes a first specific value or a non-first specific value, the first specific value indicates not to transmit ACK/NACK information corresponding to the first PDSCH or temporarily not to transmit ACK/NACK information corresponding to the first PDSCH, and the first information field is used for instructing the UE to determine a priority of a first uplink channel corresponding to the first PDSCH and a priority of a second uplink channel when the first uplink channel at least partially overlaps with the second uplink channel in time domain.

In some implementations, the priority of the first uplink channel and the priority of the second uplink channel are determined according to the first information field and transmission of the first DCI.

In some implementations, when the first DCI is transmitted after transmission of second DCI and the value of the first information field comprises the non-first specific value, the first uplink channel has higher priority, where the second DCI corresponds to the second uplink channel.

In some implementations, the second uplink channel is used for carrying ACK/NACK information corresponding to a second PDSCH, the second PDSCH is scheduled by second DCI, the second DCI includes a second information field, and a value of the second information field is indicative of transmission of the second uplink channel. When the value of the second information field is not second specific value and the value of the first information field is the non-first specific value, the first uplink channel has higher priority, where the second specific value indicates not to transmit the ACK/NACK information corresponding to the second PDSCH or temporarily not to transmit the ACK/NACK information corresponding to the second PDSCH.

In other implementations, the second uplink channel is used for carrying ACK/NACK information corresponding to a second PDSCH, the second PDSCH is scheduled by second DCI, the second DCI includes a second information field, and a value of the second information field is indicative of transmission of the second uplink channel. When the value of the second information field is a second specific value and the value of the first information field is the first specific value, the first uplink channel has higher priority, where the first specific value indicates not to transmit the ACK/NACK information corresponding to the first PDSCH, and the second specific value indicates temporarily not to transmit the ACK/NACK information corresponding to the second PDSCH.

In some implementations, the first information field and the second information field each are a PDSCH-to-HARQ_feedback timing indicator information field.

The processor may also cooperate with the memory and the communication interface to implement operations performed by the network device in the foregoing implementations.

All or part of the above implementations can be implemented through software, hardware, firmware, or any other combination thereof. When implemented by software, all or part of the above implementations can be implemented in the form of a computer program product. The computer program product includes one or more computer instructions. When the computer program instructions are applied and executed on a computer, all or part of the operations or functions of implementations are performed. The computer can be a general-purpose computer, a special-purpose computer, a computer network, or other programmable apparatuses. The computer instructions can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as an SSD), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data transmission, comprising:
   receiving first downlink control information (DCI), wherein the first DCI is used for scheduling a first physical downlink shared channel (PDSCH), and the first PDSCH carries a first hybrid automatic repeat request (HARQ) process; and
   receiving a second PDSCH after the first PDSCH, wherein
   when a value of a PDSCH feedback time information field in the first DCI is a specific value, a HARQ process carried by the second PDSCH is one of HARQ processes supported by a user equipment (UE), and the HARQ processes supported by the UE comprises the first HARQ process;
   when the value of the PDSCH feedback time information field in the first DCI is not the specific value, the HARQ process carried by the second PDSCH is not the first HARQ process.

2. The method of claim 1, wherein the specific value indicates that feedback information corresponding to the first PDSCH is triggered by signaling which transmission is not earlier than the first DCI.

3. The method of claim 1, further comprising:
   transmitting feedback information corresponding to the first PDSCH according to triggering signaling, where the triggering signaling is received after the first DCI.

4. The method of claim 3, wherein a start time of the triggering signaling is later than an end time of the first DCI.

5. The method of claim 1, wherein in case that the HARQ process carried by the second PDSCH is not the first HARQ process, a process index of the HARQ process carried by the second PDSCH is different from that of the first HARQ.

6. A user equipment (UE), comprising:
   a transceiver;
   a processor; and
   a memory configured to store program codes which, when executed by the processor, are operable with the transceiver to:
   receive first downlink control information (DCI), wherein the first DCI is used for scheduling a first physical downlink shared channel (PDSCH), and the first PDSCH carries a first hybrid automatic repeat request (HARQ) process; and
   receive a second PDSCH after the first PDSCH, wherein
   when a value of a PDSCH feedback time information field in the first DCI is a specific value, a HARQ process carried by the second PDSCH is one of HARQ processes supported by the UE, and the HARQ processes supported by the UE comprises the first HARQ process;
   when the value of the PDSCH feedback time information field in the first DCI is not the specific value, the HARQ process carried by the second PDSCH is not the first HARQ process.

7. The UE of claim 6, wherein the specific value indicates that feedback information corresponding to the first PDSCH is triggered by signaling which transmission is not earlier than the first DCI.

8. The UE of claim 6, wherein when executed by the processor, the program codes are further operable with the transceiver to:
   transmit feedback information corresponding to the first PDSCH according to triggering signaling, wherein the triggering signaling is received after the first DCI.

9. The UE of claim 8, wherein a start time of the triggering signaling is later than an end time of the first DCI.

10. The UE of claim 6, wherein in case that the HARQ process carried by the second PDSCH is not the first HARQ process, a process index of the HARQ process carried by the second PDSCH is different from that of the first HARQ.

11. A network device, comprising:
    a transceiver;
    a processor; and
    a memory configured to store program codes which, when executed by the processor, are operable with the transceiver to:
    transmit first downlink control information (DCI), wherein the first DCI is used for scheduling a first physical downlink shared channel (PDSCH), and the first PDSCH carries a first hybrid automatic repeat request (HARQ) process; and
    transmit a second PDSCH after the first PDSCH, wherein
    when a value of a PDSCH feedback time information field in the first DCI is a specific value, a HARQ process carried by the second PDSCH is one of HARQ processes supported by a user equipment (UE), and the HARQ processes supported by the UE comprises the first HARQ process;
    when the value of the PDSCH feedback time information field in the first DCI is not the specific value, the HARQ process carried by the second PDSCH is not the first HARQ process.

12. The network device of claim 11, wherein the specific value indicates that feedback information corresponding to the first PDSCH is triggered by signaling which transmission is not earlier than the first DCI.

13. The network device of claim 11, wherein when executed by the processor, the program codes are further operable with the transceiver to:
    receive feedback information corresponding to the first PDSCH which is transmitted by the UE according to triggering signaling, wherein the triggering signaling is transmitted to the UE after the first DCI.

14. The network device of claim 13, wherein a start time of the triggering signaling is later than an end time of the first DCI.

15. The network device of claim 11, wherein in case that the HARQ process carried by the second PDSCH is not the first HARQ process, a process index of the HARQ process carried by the second PDSCH is different from that of the first HARQ.

* * * * *